(12) United States Patent
Okazaki et al.

(10) Patent No.: US 7,016,582 B2
(45) Date of Patent: Mar. 21, 2006

(54) POLARIZED WAVE HOLDING OPTICAL FIBER, AND METHOD OF PRODUCING THE SAME

(75) Inventors: Iwao Okazaki, Yokohama (JP); Ichiro Tsuchiya, Yokohama (JP); Shinji Ishikawa, Yokohama (JP); Motohide Yoshida, Yokohama (JP); Tetsuya Haruna, Yokohama (JP); Kazuyuki Soma, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 82 days.

(21) Appl. No.: 10/473,678

(22) PCT Filed: Mar. 4, 2003

(86) PCT No.: PCT/JP03/02502

§ 371 (c)(1),
(2), (4) Date: Sep. 30, 2003

(87) PCT Pub. No.: WO03/075058

PCT Pub. Date: Sep. 12, 2003

(65) Prior Publication Data

US 2004/0114895 A1    Jun. 17, 2004

(30) Foreign Application Priority Data

Mar. 4, 2002   (JP) .............................. 2002-057616
Sep. 12, 2002  (JP) .............................. 2002-267234

(51) Int. Cl.
G02B 6/02    (2006.01)
C03B 37/028  (2006.01)
C03B 37/02   (2006.01)
C03B 37/07   (2006.01)
C03B 37/22   (2006.01)

(52) U.S. Cl. .......................... 385/123; 65/412; 65/435; 65/382; 65/403

(58) Field of Classification Search .................. 65/385, 65/412, 435, 382, 403
See application file for complete search history.

(56) References Cited

U.S. PATENT DOCUMENTS

| | | | | |
|---|---|---|---|---|
| 4,529,426 | A | * | 7/1985 | Pleibel et al. .................. 65/403 |
| 4,859,223 | A | * | 8/1989 | Kajioka et al. ................ 65/403 |
| 5,482,525 | A | * | 1/1996 | Kajioka et al. ................ 65/398 |
| 6,493,473 | B1 | * | 12/2002 | Wooten ........................ 385/11 |
| 6,738,549 | B1 | * | 5/2004 | Inaba et al. .................. 385/123 |

FOREIGN PATENT DOCUMENTS

EP    0 630 864    12/1994

(Continued)

Primary Examiner—Brian Healy
Assistant Examiner—Charlie Peng
(74) Attorney, Agent, or Firm—McDermott Will & Emery LLP

(57) ABSTRACT

Based on an intermediate 20A in which a cladding portion 22 is formed on the outer periphery of a core portion 21, a pair of holes 23 and 24 are provided parallel to the z axis on both sides of the core portion 21 within the cladding portion 22, and an intermediate 20 is thereby fabricated. In this intermediate 20, a width Ry in the y-axis direction is made smaller than a width Rx in the x-axis direction. Moreover, a cylindrical stress applying part 33 is inserted into a hole 23 of the intermediate 20, and a cylindrical stress applying part 34 is inserted into a hole 24 thereof. Thus, a preform 40 is formed. These materials are drawn and integrated together, and a polarization maintaining optical fiber is thereby manufactured.

14 Claims, 11 Drawing Sheets

FOREIGN PATENT DOCUMENTS

| | | |
|---|---|---|
| EP | 0 732 604 | 9/1996 |
| JP | 58-104033 | 6/1983 |
| JP | 58-179802 | 10/1983 |
| JP | 60-242406 | 12/1985 |
| JP | 62-12626 | 1/1987 |
| JP | 63-8233 | 1/1988 |
| JP | 01-153551 | 6/1989 |
| JP | 11-295545 | 10/1999 |
| JP | P2001-220168 A | 8/2001 |
| JP | P2002-139649 A | 5/2002 |
| JP | P2003-29072 A | 1/2003 |
| JP | P2003-140002 A | 5/2003 |

* cited by examiner

POLARIZED WAVE HOLDING OPTICAL FIBER, AND METHOD OF PRODUCING THE SAME

This application is the national stage under 35 U.S.C. §371 of PCT International Application No. PCT/JP03/02502 which has an International filing date of Mar. 4, 2003, which designated the United States of America, which also claims foreign priority under 35 U.S.C. §119 to Application No. 2002-057616 filed in Japan on Mar. 4, 2002, Application No. 2002-267234 filed in Japan on Sep. 12, 2002. The entire contents of all of the above applications are hereby incorporated by reference.

TECHNICAL FIELD

The present invention relates to a polarization maintaining optical fiber having a pair of stress applying regions on both sides of a core region within a cladding region, and a method of manufacturing the foregoing polarization maintaining optical fiber.

BACKGROUND ART

A typical polarization maintaining optical fiber includes a pair of stress applying regions on both sides of a core region within a cladding region. In this polarization maintaining optical fiber, the residual stress component in the first direction connecting the respective centers of the pair of stress applying regions differ the residual stress component in the second direction being orthogonal thereto, thereby the optical fiber has birefringence. Accordingly, it is possible to propagate light while maintaining a polarized state of the light.

An example of a method of manufacturing this conventional polarization maintaining optical fiber will be described below. A cladding portion made of silica glass is formed on an outer periphery around a cylindrical core portion made of $GeO_2$ doped silica glass. Then, an intermediate is formed by providing a pair of cylindrical holes within the cladding portion in parallel along the axial direction on both sides of the core portion. A cylindrical stress applying part made of $B_2O_3$ doped silica glass is inserted into each of the pair of holes on the intermediate, and by drawing from these materials and integrating them together, a polarization maintaining optical fiber is obtained.

According to this drawing, the core portion of the intermediate becomes the core region of the polarization maintaining optical fiber, the cladding portion of the intermediate becomes the cladding region of the polarization maintaining optical fiber, and the stress applying parts of the intermediate become the stress applying regions of the polarization maintaining optical fiber. Moreover, since the stress applying parts and the cladding portion have different thermal expansion coefficients, the residual stresses having non-axisymmetry act on the core region in the manufactured polarization maintaining optical fiber owing to heating at the drawing and cooling after the drawing, and the birefringence is thereby generated.

JP 60-242406A discloses a method of drawing an optical fiber, which maintains a flat plane on a cladding surface, by use of a preform in which a cladding surface on the side without provision of a stress applying part is polished into a flat plane in advance. Meanwhile, JP 2001-220168A discloses a method of manufacturing a multi-mode optical fiber having a core with a noncircular cross section by use of a preform having a noncircular cross section.

DISCLOSURE OF THE INVENTION

However, in the polarization maintaining optical fiber manufactured by the above-described conventional technology, a periphery around the cladding region thereof is not accurately circular but is noncircular. If the periphery around the cladding region of the polarization maintaining optical fiber is noncircular, a situation that the end portion may not be able to be inserted into a ferrule of the optical connector when connecting an optical connector to an end portion of this polarization maintaining optical fiber. Moreover, when such polarization maintaining optical fiber is connected to another polarization maintaining optical fiber, a loss resulting from an offset of core axes or a variation in polarization characteristics resulting from an off-angle of polarization axes may also occur.

The present invention has been made to resolve the foregoing problems. It is an object of the present invention to provide a polarization maintaining optical fiber and method of manufacturing a polarization maintaining optical fiber and a method of manufacturing a polarization maintaining optical fiber which enables a reduction on noncircularity of an periphery around a cladding region.

A method of manufacturing a polarization maintaining optical fiber according to the present invention is a method having a pair of stress applying regions on both sides of a core region existing in an axial direction within a cladding region surrounding this core region, which is characterized by including the steps of: fabricating an intermediate including a cladding portion which constitutes the cladding region and surrounds a core portion constituting the core region, the cladding portion including a pair of holes existing in parallel with the axial direction on both sides of the core portion, a cross section perpendicular to the axial direction of the intermediate being designed that a width in a first direction connecting centers of the pair of holes is larger than a width in a second direction being orthogonal thereto; inserting stress applying parts into the pair of holes of this intermediate, the stress applying parts having outer diameters slightly smaller than inner diameters of the holes; and manufacturing the polarization maintaining optical fiber by drawing and integrating the foregoing constituents together.

In this method of manufacturing a polarization maintaining optical fiber, a slight gap exists between an inner surface of the hole and an outer surface of the stress applying part. Because the stress applying part is inserted into the hole of the intermediate. Therefore, when the polarization maintaining optical fiber is manufactured by drawing these materials, a reduction rate of the width in the first direction mutually connecting the respective centers of the pair of stress applying regions becomes greater than a reduction rate of the width in the second direction which is orthogonal thereto. However, since the width in the second direction is made smaller than the width in the first direction in the intermediate, the polarization maintaining optical fiber obtained by drawing has a ratio of the width in the first direction to the width in the second direction which close to 1, whereby the degree of the noncircularity of the outer periphery around the cladding region is reduced.

Another method of manufacturing a polarization maintaining optical fiber according to the present invention is a method having a pair of stress applying regions on both sides of a core region existing in an axial direction within a cladding region surrounding this core region. It is characterized by including the steps of: preparing an intermediate including a cladding portion which constitutes the cladding region and surrounds a core portion constituting the core region, the cladding portion including a pair of holes existing in parallel with the axial direction on both sides of the core portion; manufacturing an optical fiber preform by inserting stress applying parts into the pair of holes of the intermediate, the stress applying parts having outer diameters slightly smaller than inner diameters of the holes; and manufacturing the polarization maintaining optical fiber by drawing and integrating the preform at drawing tension from 1 g to 10 g inclusive while setting a non-circularity of cladding at 1% or less at a point where an outer diameter of a neck-down portion of the optical fiber preform becomes 3 mm.

Even in this method of manufacturing a polarization maintaining optical fiber, a slight gap exists between an inner surface of the hole and an outer surface of the stress applying part in the state where the stress applying part is inserted into the hole of the intermediate. Therefore, when the polarization maintaining optical fiber is manufactured by drawing these materials, a reduction rate of a width in a first direction mutually connecting respective centers of the pair of stress applying regions becomes larger than a reduction rate of a width in a second direction which is orthogonal thereto. However, by drawing and integrating the preform at the drawing tension from 1 g to 10 g inclusive while setting the non-circularity of cladding at 1% or less at a point where the outer diameter of the neck-down portion of the optical fiber preform becomes 3 mm, the non-circularity of the outer periphery around the cladding region is reduced in the polarization maintaining optical fiber thus obtained by drawing. It is preferable that the width in the first direction connecting the centers of the pair of holes be formed greater than the width in the second direction being orthogonal thereto at a cross section perpendicular to the axial direction of the intermediate. In this case, the non-circularity of the outer periphery around the cladding region is further reduced.

In the method of manufacturing a polarization maintaining optical fiber according to the present invention, it is preferable that a shape of the cross section perpendicular to the axial direction of the preform of the intermediate be circular, and that the intermediate be fabricated by grinding an outer peripheral portion in the second direction. In the cross section perpendicular to the axial direction of the intermediate, it is preferable that the width in the second direction be smaller than the width in the first direction by 0.5% to 10%. It is more preferable that the width in the second direction be smaller by 2% to 7%. If this ratio is excessively small, the degree of improvement in noncircularity of the optical fiber is small. If this ratio is excessively large, the width in the second direction of the optical fiber becomes excessively small and promotes noncircularity to the contrary. Moreover, it is preferable that a shape of a cross section perpendicular to the axial direction of the core portion of the intermediate be a shape in which both end portions on the diameter along at least any of the first direction and the second direction are disposed relative to an inscribed circle thereof as closer to a center side of the circle than a circumference of this circle. It is possible to limit noncircularity of the core by use of the thus intermediate. In this method, the degree as to which end portions in the first direction or the second directions are disposed how close to the center in order to limit noncircularity of the core varies depending on shapes of the stress applying parts, the cladding portion, and the like. Moreover, it is preferable that drawing speed upon drawing be 90 m/min or less and that the drawing tension be 16 g or less.

Moreover, it is preferable that the method of manufacturing a polarization maintaining optical fiber according to the present invention further includes the step of heating the optical fiber preform after insertion of the stress applying parts severally into the pair of holes of the intermediate while setting respective gaps between the pair of holes and the stress applying parts as an atmosphere of any of inert gas and halogen gas.

A polarization maintaining optical fiber according to the present invention has a pair of stress applying parts on both sides of a core region within a cladding region surrounding the core region existing in an axial direction, in which a non-circularity of cladding is 1.0% or less. Moreover, it is more preferable that the non-circularity of cladding be 0.5% or less. Furthermore, it is preferable that an angular variation of an MFD be 2% or less. Such a polarization maintaining optical fiber is manufactured by the aforementioned methods of manufacturing a polarization maintaining optical fiber according to the present invention.

A core rod for a polarization maintaining optical fiber according to the present invention is a core rod used as a material for a polarization maintaining optical fiber, in which a shape of a cross section orthogonal to an axial direction has a circular shape where both ends at least in one diametrical direction are removed. A non-circularity of a core is limited in a polarization maintaining optical fiber which is formed by use of this core rod.

Furthermore, an optical fiber communication system according to the present invention is preferably configured by connecting a transmitter and a receiver with the above-described polarization maintaining optical fiber for transmitting an optical signal.

BRIEF DESCRIPTION OF THE DRAWINGS

FIG. 1A and FIG. 1B are explanatory views of a polarization maintaining optical fiber, of which FIG. 1A is a transverse sectional view perpendicular to an axial direction, and FIG. 1B is a longitudinal view along the axial direction;

FIG. 2A to FIG. 2C are explanatory views for an intermediate and an optical fiber preform used in a first embodiment of a method of manufacturing a polarization maintaining optical fiber according to the present invention, of which FIG. 2A is a cross-sectional view showing a preform for the intermediate, FIG. 2B is a cross-sectional view showing the intermediate, and FIG. 2C is a cross-sectional view showing the optical fiber preform;

FIG. 10A to FIG. 10C are explanatory views for an intermediate and an optical fiber preform used in a third embodiment of the method of manufacturing a polarization maintaining optical fiber according to the present invention, of which FIG. 10A is a cross-sectional view showing a preform for the intermediate, FIG. 10B is a cross-sectional view showing the intermediate, and FIG. 10C is a cross-sectional view showing the optical fiber preform;

BEST MODES FOR CARRYING OUT THE INVENTION

Figure 1A:
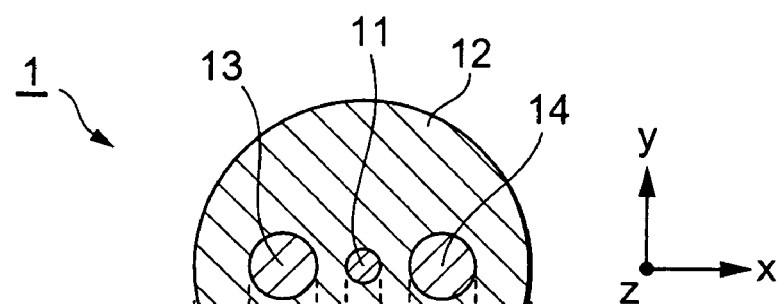

Now, embodiments of the present invention will be described in detail with reference to the accompanying drawings. Note that the same elements are denoted by the same reference numerals throughout the description of the drawings, and overlapping explanation will be omitted.

First, the contents of examination by the inventor will be described regarding a cause of that an outer periphery around a cladding region of a polarization maintaining optical fiber manufactured according to a conventional manufacturing method becomes noncircular. The following reason is considered for that the outer periphery around the cladding region of the polarization maintaining optical fiber becomes noncircular. In the state where the stress applying part is inserted into the hole of the intermediate, a slight gap exists between the inner surface of the hole and the outer surface of the stress applying part. In other words, because of existence of such a gap, even if the periphery around the cladding portion of the intermediate constitutes an accurate circle, the width in the first direction mutually connecting the respective centers of the pair of stress applying regions becomes narrower than the width in the second direction which is orthogonal to this first direction in the polarization maintaining optical fiber obtained by drawing. Thus, it is considered that the outer periphery around the cladding region of the polarization maintaining optical fiber does not constitute an accurate circle but becomes noncircular. The present invention has been made based on the examination.

Figure 1B:
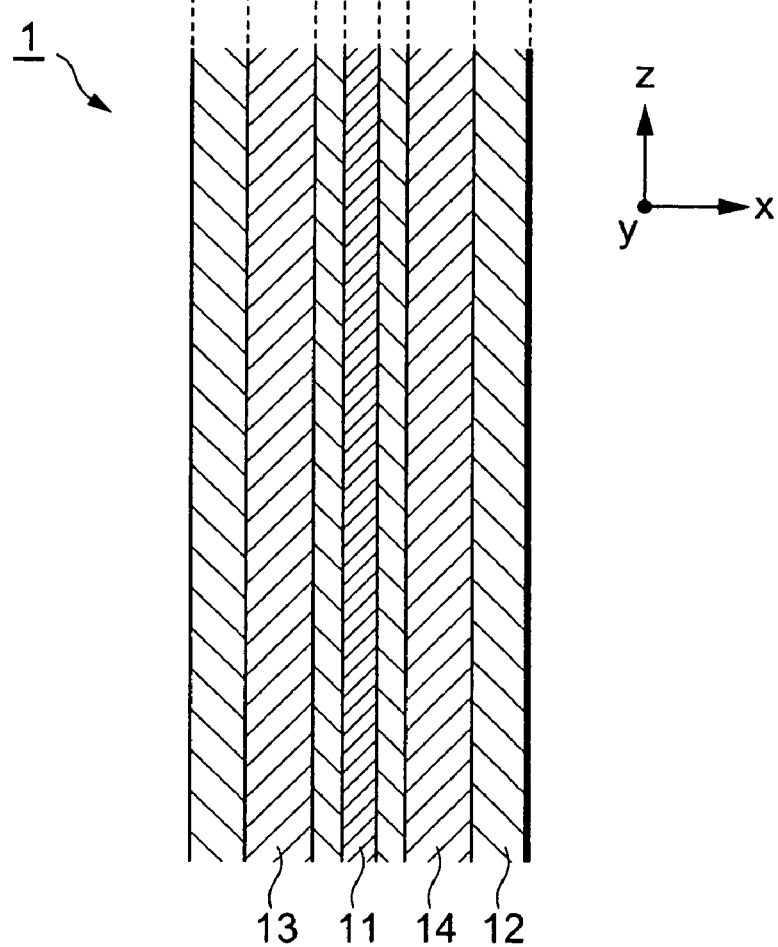

Next, description will be given of a polarization maintaining optical fiber to be manufactured by a method of manufacturing a polarization maintaining optical fiber according to this embodiment. FIG. 1A and FIG. 1B are explanatory views of a polarization maintaining optical fiber 1. To facilitate explanation, these drawings also show an XYZ orthogonal coordinate system having a z axis which is parallel to an optical axis of the polarization maintaining optical fiber 1. FIG. 1A shows a cross section (a transverse section) of the polarization maintaining optical fiber 1 when sectioned along a perpendicular plane to the optical axis, and FIG. 1B shows a cross section (a longitudinal section) of the polarization maintaining optical fiber 1 when sectioned along a plane including the optical axis.

The polarization maintaining optical fiber 1 shown in these drawings includes a core region 11 having a circular cross-sectional shape, a cladding region 12 surrounding this core region 11 and having a circular outer periphery, and a pair of stress applying regions 13 and 14 provided on both sides of the core region 11 within the cladding region 12. A first direction mutually connecting respective centers of the stress applying regions 13 and 14 is parallel to the x axis, and a second direction orthogonal to the first direction is parallel to the y axis. The core region 11 is made of $GeO_2$-doped silica glass, and the cladding region 11 is made of silica glass. Meanwhile, the stress applying regions 13 and 14 are severally made of $B_2O_3$-doped silica glass.

In this polarization maintaining optical fiber 1, the core region 11 has a higher refraction index than the cladding region 12, whereby it is possible to propagate light toward a direction parallel to the z axis. Meanwhile, this polarization maintaining optical fiber 1 has residual stresses acting on the core region 11, which are different in terms of the x-axis direction and the y-axis direction. Accordingly, the polarization maintaining optical fiber 1 has birefringence and is capable of propagating the light while maintaining a polarized state of the light.

FIRST EMBODIMENT

Figure 2A:
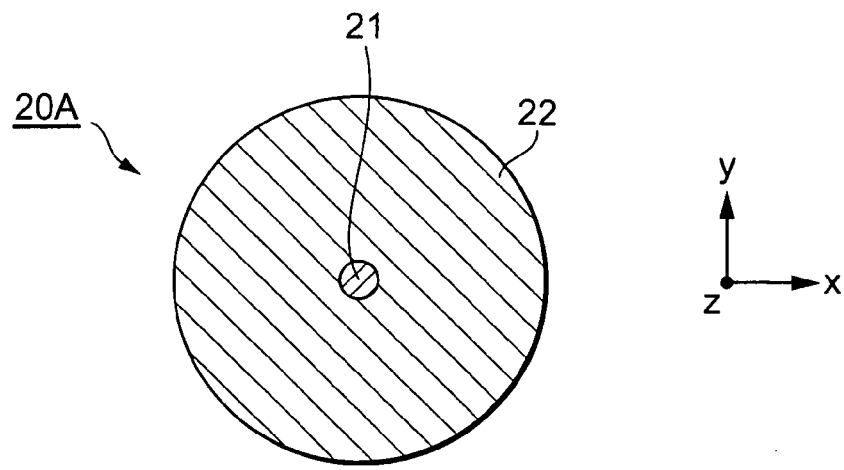
Figure 2B:
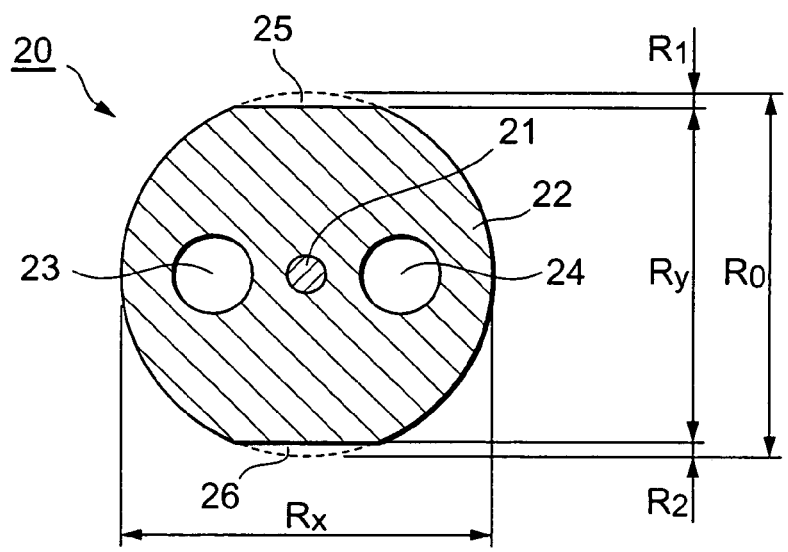
Figure 2C:
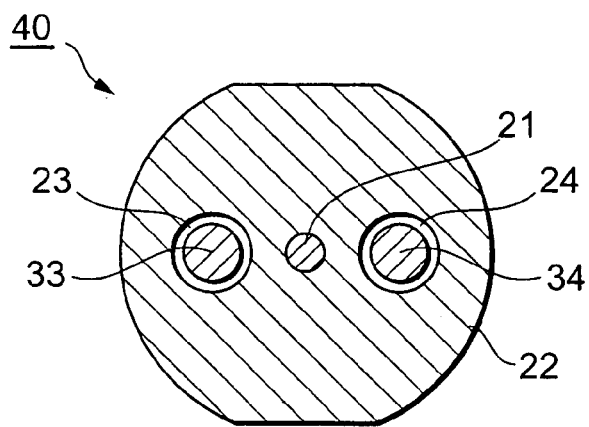
Figure 3:
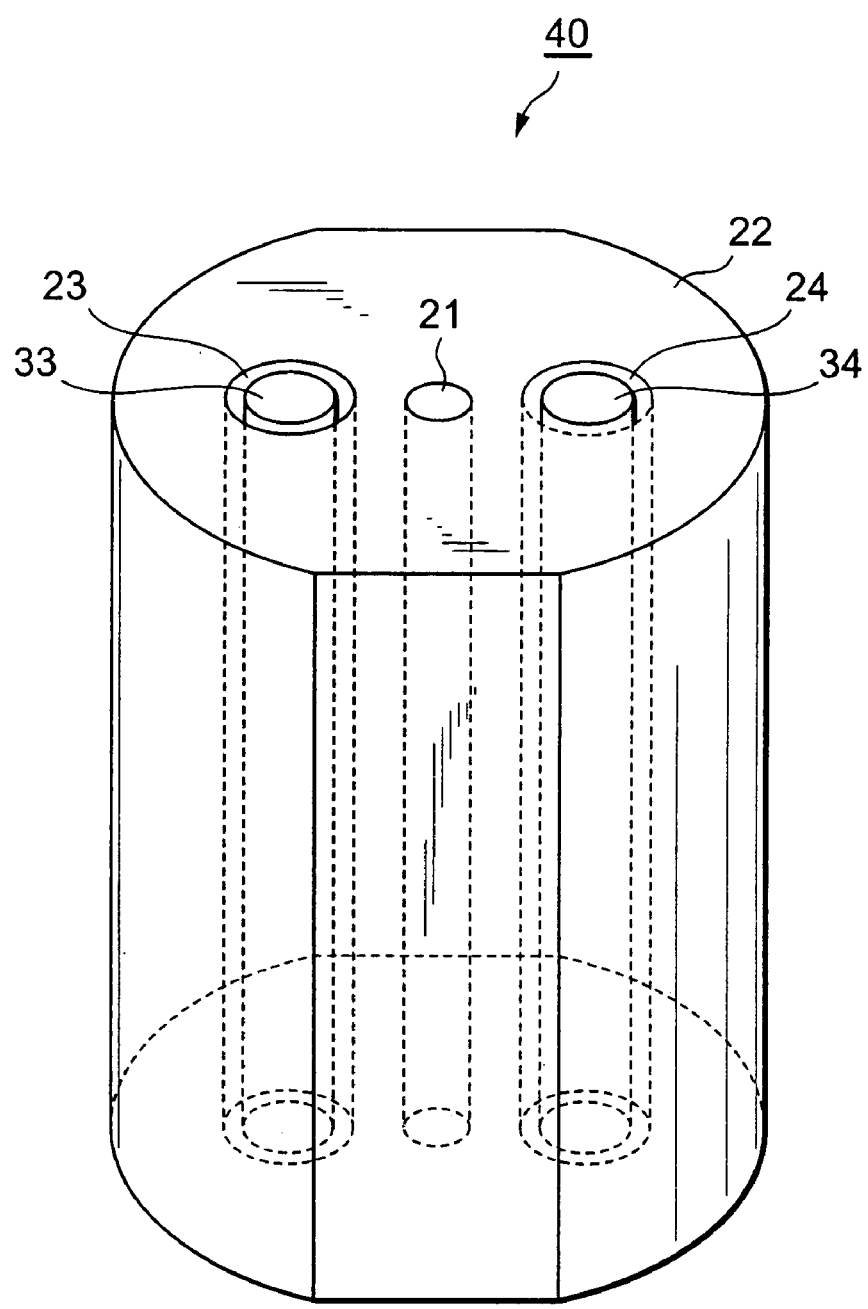
FIG. 3 is a perspective view of the optical fiber preform of FIG. 2C.
Figure 4:
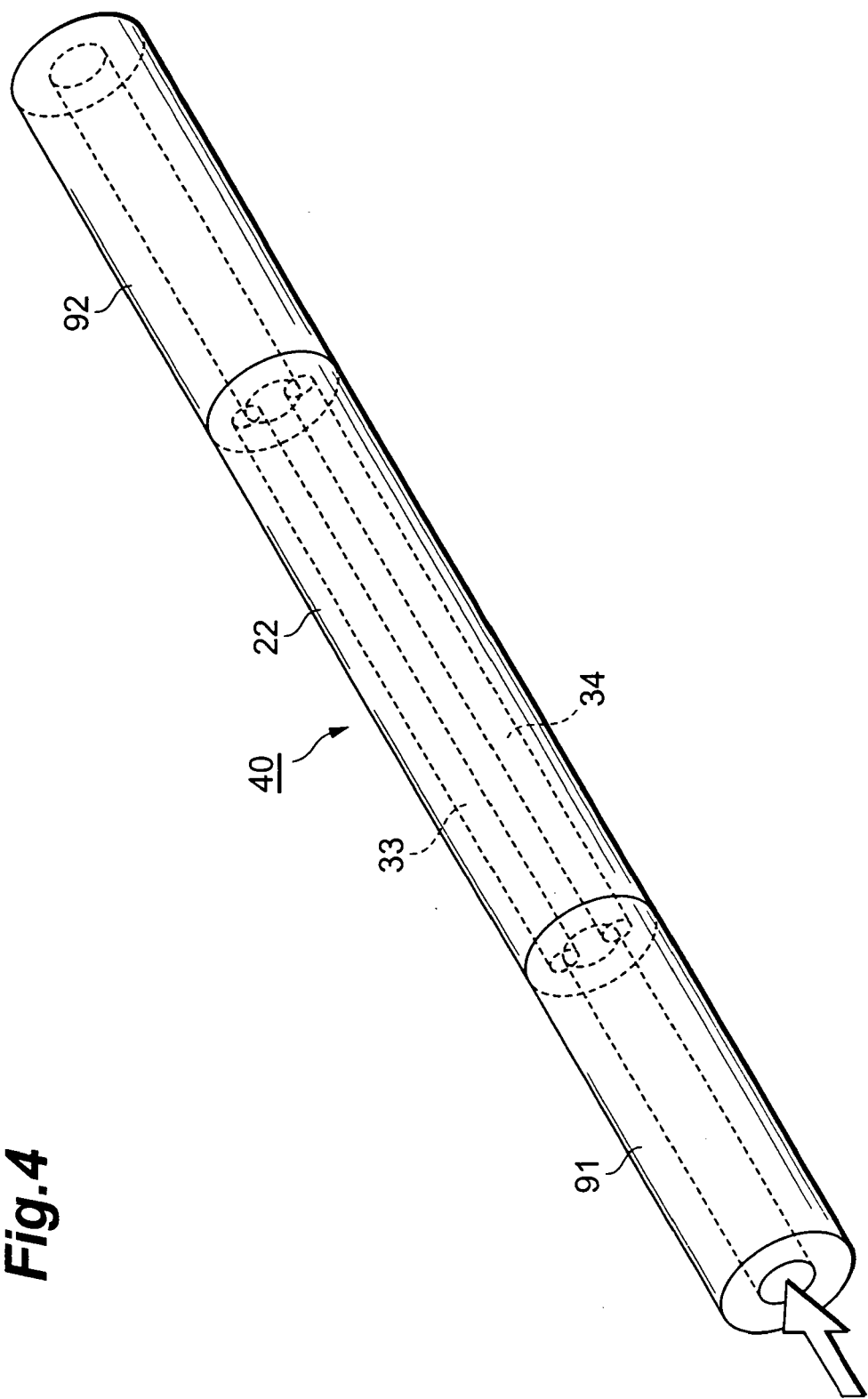
FIG. 4 is a perspective view showing an aspect in which dummy pipes 91 and 92 are fitted to both ends of the optical fiber preform of FIG. 3.
Figure 5:
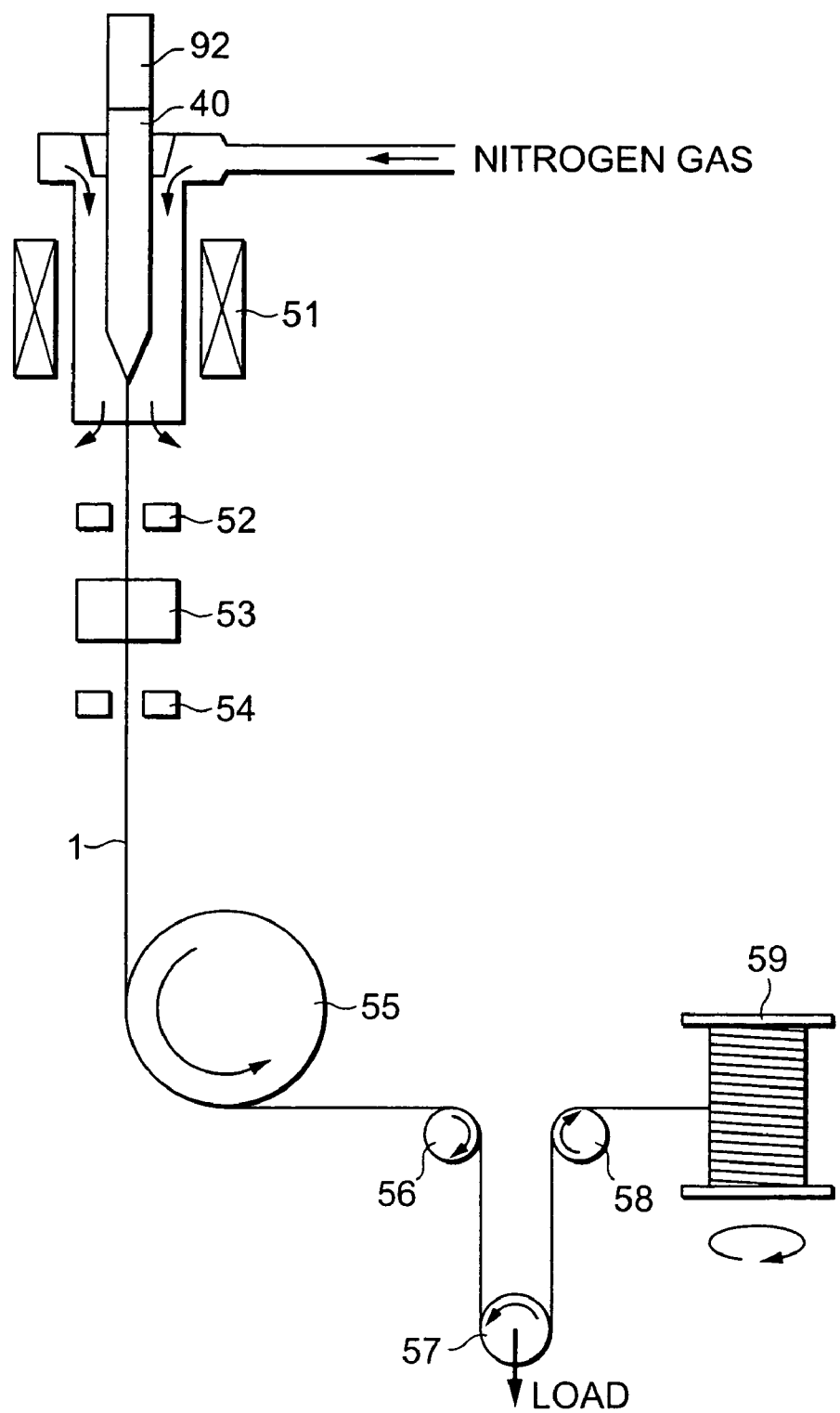
FIG. 5 is an explanatory view for a drawing process in the first embodiment.

Next, a description will be given of a first embodiment of a method of manufacturing a polarization maintaining optical fiber according to the present invention. FIG. 2A to FIG. 2C and FIG. 3 to FIG. 5 are explanatory views for the method of manufacturing a polarization maintaining optical fiber of this first embodiment, respectively. FIG. 2A to FIG. 2C show cross-sectional shapes of an intermediate 20 and an optical fiber preform 40 and a fabrication process in this first embodiment. FIG. 3 is a perspective view showing the shape of this optical fiber preform 40. FIG. 4 is a view showing an aspect in which dummy pipes 91 and 92 are connected to both ends of the optical fiber preform 40 shown in FIG. 3. Meanwhile, FIG. 5 is a schematic view showing a drawing process in this first embodiment.

First, an intermediate preform 20A as shown in FIG. 2A is fabricated. In this intermediate preform 20A, a cladding portion 22 (which constitutes the cladding region 12 of the polarization maintaining optical fiber 1) made of silica glass is formed on the outer periphery of a cylindrical core portion 21 (which constitutes the core region 11 of the polarization maintaining optical fiber 1) made of $GeO_2$-doped silica glass. This intermediate preform 20A is fabricated by the VAD method, the OVD method, the MCVD method, and the like.

Subsequently, the intermediate 20 as shown in FIG. 2B is fabricated from this intermediate preform 20A. In this intermediate 20, a pair of holes 23 and 24 are provided on both sides of the core portion 21 within the cladding portion 22, parallel to the z axis. The first direction mutually connecting respective centers of the pair of holes 23 and 24 is parallel to the x axis. Moreover, in this intermediate 20, a width $R_y$ in the y-axis direction is made smaller than a width $R_x$ in the x-axis direction. The formation of the holes 23 and 24 is achieved by a mechanical drilling process. Furthermore, reduction in the width $R_y$ in the y-axis direction more than the width $R_x$ in the x-axis direction is achieved by mechanically grinding a +y-side portion 25 of the outer periphery of the cladding portion 22 by a thickness of $R_1$ to form a flat surface and by mechanically grinding a –y-side portion 26 of the outer periphery of the cladding portion 22 by a thickness of $R_2$ to form a flat surface. Herein, such mechanical grinding is achieved by, for example, a machining center.

Then, the preform 40 as shown in FIG. 2C and FIG. 3 is fabricated from this intermediate 20. In this preform 40, a cylindrical stress applying part 33 is inserted into the hole 23 of the intermediate 20, and a cylindrical stress applying part 34 is inserted into the hole 24. The stress applying parts 33 and 34 are made of $B_2O_3$-doped silica glass.

Thereafter, as shown in FIG. 4, the dummy pipe 91 is connected to one end of the preform 40, and the dummy pipe 92 is connected to the other end of the preform 40. Each of the dummy pipes 91 and 92 has an outer diameter which is almost the same as that of the preform 40 and an inner diameter which is almost equivalent to a length of a line mutually connecting respective center points of the holes 23 and 24. As a result, gas can pass from an internal space of the dummy pipe 91 on one end to an internal space of the dummy pipe 92 on the other end through the gaps between the holes 23 and 24 and the stress applying parts 33 and 34 in the preform 40.

Then, in this state, while flowing inert gas or halogen gas such as chlorine gas from the internal space of the dummy pipe 91 on one side to the internal space of the dummy pipe 92 on the other side (a description will be hereinafter given in a case of using helium gas as an example), and the preform 40 is heated as the preform 40 is rotated. Such heating may be conducted by use of flame or induction heating. In this way, the gaps between the holes 23 and 24 and the stress applying parts 33 and 34 in the preform 40 are cleaned. The cleaning is not sufficiently performed if a heating temperature is equal to or below 700° C.; meanwhile, the stress applying parts 33 and 34 may be cracked if the heating temperature is equal to or higher than 1600° C. Accordingly, it is preferable that the heating temperature be in the range from 800° C. to 1500° C.

In the preform 40 thus processed, the spaces inside the holes are once replaced by helium gas, and then the spaces inside the holes are vacuumed. Then, one end (on the dummy pipe 91 side) of the preform 40 is sealed, and the dummy pipe 91 is cut off. Thereafter, a central portion of the other dummy pipe 92 is heated and thereby sealed. Then, as shown in FIG. 5, the preform 40 is drawn and integrated, and the polarization maintaining optical fiber 1 is thereby manufactured. More specifically, the preform 40 is disposed inside a heating furnace 51 to which inert gas is supplied, and a lower end portion of the preform 40 is heated and extended into a smaller diameter, and is thereby formed into the polarization maintaining optical fiber 1. Regarding the polarization maintaining optical fiber 1 coming out of the heating furnace 51, a cladding diameter thereof is measured with an outer diameter gauge 52, the polarization maintaining optical fiber 1 is coated with resin by a coating device 53, and an outer diameter of the coated layer is measured with an outer diameter gauge 54. Furthermore, this polarization maintaining optical fiber 1 passes through in order of a capstan 55, a roller 56, a dancer roller 57, and a roller 58, and is rolled up around a bobbin 59. Drawing speed and drawing tension in fiber drawing are determined by rotation speed of the capstan 55 and the heating temperature on the preform 40 by the heating furnace 51 (electric power supplied to the heating furnace 51).

In this embodiment, the spaces inside the holes of the preform 40 are once filled with helium, and the spaces inside the holes are vacuumed. Accordingly, it is possible to drastically reduce frequencies of sudden changes in the outer diameter of the optical fiber even if the tension is set low. It is because the optical fiber is not influenced by impurities so that no spikes are generated by carrying out the above-described operations even when the heating temperature for the preform is raised for drawing at low tension. Spike portions are discarded as abnormal spots. Accordingly, the optical fiber after drawing will be cut into pieces if there are numerous spikes, and it is not possible to obtain a long optical fiber. Moreover, it also takes time to remove the abnormal spots, and the productivity is thereby degraded.

According to the above-described manufacturing method, in the state of the preform 40 where the stress applying parts 33 and 34 are inserted into the holes 23 and 24 of the intermediate 20 (FIG. 2C and FIG. 3), the slight gap exists between the inner wall surface of the hole 23 and the outer wall surface of the stress applying part 33, and the slight gap also exists between the inner wall surface of the hole 24 and the outer wall surface of the stress applying part 34. Therefore, when the polarization maintaining optical fiber 1 is manufactured by drawing this preform 40, a reduction rate of the width in the x-axis direction mutually connecting the respective centers of the pair of stress applying regions 33 and 34 $((R_x-r_x)/R_x)$ becomes greater than a reduction rate of the width in the y-axis direction $((R_y-r_y)/R_y)$. Thus, there is a relationship expressed as:

$$(R_x-r_x)/R_x > (R_y-r_y)/R_y \qquad (1)$$

Herein, $r_x$ is the width in the x-axis direction of the polarization maintaining optical fiber 1, and $r_y$ is the width in the y-axis direction of the polarization maintaining optical fiber 1. These reduction rates substantially depend on respective values of $R_x$ and $R_y$, a value of the gap between the inner wall surface of the hole 23 and the outer wall surface of the stress applying part 33, and a value of the gap between the inner wall surface of the hole 24 and the outer wall surface of the stress applying part 34.

However, in this embodiment, the width $R_y$ in the y-axis direction is arranged to be smaller than the width $R_x$ in the x-axis direction regarding the intermediate 20 and the preform 40. Specifically, there is a relationship expressed as:

$$R_x > R_y \qquad (2)$$

Due to such an arrangement, in the polarization maintaining optical fiber 1 obtained by drawing the preform 40, a ratio of the width $r_x$ in the x-axis direction to the width $r_y$ in the y-axis direction comes close to 1, and the non-circularity of the outer periphery around the cladding region 12 is thereby reduced. Therefore, when an optical connector is connected to an end of the polarization maintaining optical fiber 1 which is manufactured by this manufacturing method, it is easy to insert the end into a ferrule of the optical connector. Moreover, when such polarization maintaining optical fiber 1 is connected to another polarization maintaining optical fiber, occurrence of a core axes offset, or a polarization axes offset is limited.

In the intermediate 20 and the preform 40, a ratio of the width $R_x$ in the x-axis direction to the width $R_y$ in the y-axis direction is set appropriately in accordance with ratios of the values of these widths to the values of the gaps. For example, when the widths $R_x$ and $R_y$ are set to 33 mm, the value of the gap between the inner surface of the hole 23 and the outer surface of the stress applying part 33 is set to 0.5 mm, and the value of the gap between the inner wall surface of the hole 24 and the outer wall surface of the stress applying part 34 is set to 0.5 mm, it is preferable that the width $R_y$ in the y-axis direction be smaller than the width $R_x$ in the x-axis direction by 0.5% to 10%. In other words, it is preferable to satisfy the following relational expression of:

$$0.90 \leq R_y/R_x \leq 0.995 \qquad (3)$$

It is more preferable if $$0.90 \leq R_y/R_x \leq 0.98 \qquad (4)$$

is satisfied, and it is even more preferable if $$0.90 \leq R_y/R_x \leq 0.97 \qquad (5)$$

is satisfied. Meanwhile, it is preferable that the intermediate 20 be formed into the above-described shape and the drawing speed upon drawing is set 90 m/min or less. Moreover, the drawing tension is preferably set to 16 g or below, more preferably 10 g or less, and most preferably 5 g or less. Furthermore, in the polarization maintaining optical fiber manufactured by this manufacturing method, it is possible to set a non-circularity of cladding to 1.0% or less, or even 0.5% or less.

Next, a description will be given regarding examples of this first embodiment. Table 1 is a chart arranging respective parameters in Examples 1 to 6.

TABLE 1

Parameters in Examples 1 to 6

|  | Examples | | | | | |
| --- | --- | --- | --- | --- | --- | --- |
|  | 1 | 2 | 3 | 4 | 5 | 6 |
| Grinding Amount (%) | 2 | 2 | 3 | 3 | 3 | 3 |
| Drawing Speed (m/min.) | 85 | 90 | 90 | 90 | 90 | 50 |
| Tension (g) | 15 | 10 | 16 | 9 | 18 | 5 |
| Cladding Noncircularity Ratio (%) | 1.0 | 0.9 | 0.9 | 0.7 | 1.0 | 0.3 |

In Examples 1 and 2, the outer diameter of the cladding portion 22 before grinding was set to 33.4 mm, a length thereof was set to 290 mm, and a grinding amount in they-axis direction was set to 2% (i.e., $R_y/R_x=0.98$). In Examples 3 to 6, the outside diameter of the cladding portion 22 before grinding was set to 34.0 mm, a length thereof was set to 300 mm, and a grinding amount in the y-axis direction was set to 3% (i.e., $R_y/R_x=0.97$). In each case from Examples 1 to 6, inner diameters of the holes 23 and 24 were set to 0.45 mm, and outer diameters of the stress applying parts 33 and 34 were set from 10.1 to 10.2 mm.

The drawing speed upon drawing was set to 85 m/min. in Example 1, 90 m/min. in Examples 2 to 5, and 50 m/min. in Example 6. Meanwhile, the drawing tension was set to 15 g (13.9 kW of electric power supplied to the heating furnace 51) in Example 1, 10 g (14.2 kW of electric power supplied to the heating furnace 51) in Example 2, 16 g (13.9 kW of electric power supplied to the heating furnace 51) in Example 3, 9 g (14.1 kW of electric power supplied to the heating furnace 51) in Example 4, 18 g (13.5 kW of electric power supplied to the heating furnace 51) in Example 5, and 5 g (14.5 kW of electric power supplied to the heating furnace 51) in Example 6.

The non-circularity of the outer periphery around the cladding regions of the polarization maintaining optical fibers manufactured by drawing were calculated based on maximum diameters and minimum diameters measured with a gauge made by Photon Kinetics Inc. In each case throughout Examples 1 to 6, the obtained non-circularity was 1% or less. Particularly, in Example 4 where the drawing tension was set to 9 g, the non-circularity of the outer periphery around the cladding region of the manufactured polarization maintaining optical fiber was 0.7%. Meanwhile, in Example 6 where the drawing speed was set to 50 m/min. and the drawing tension was set to 5 g, the non-circularity of the outer periphery around the cladding region of the manufactured polarization maintaining optical fiber was 0.3%.

Figure 6:
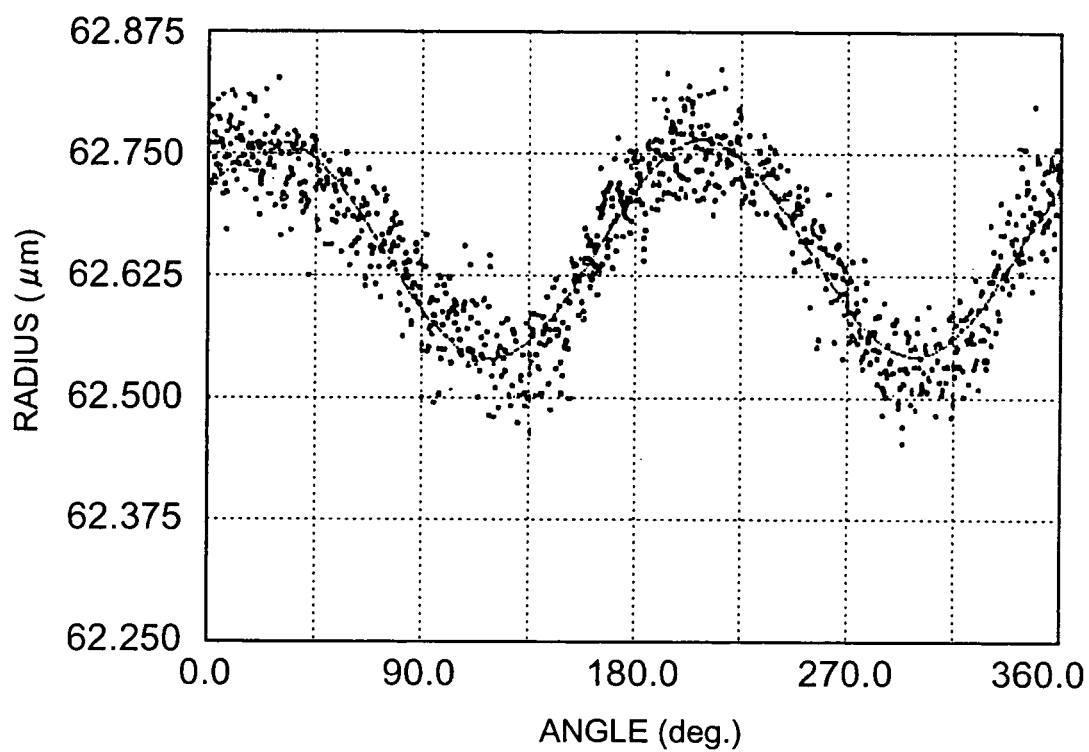
FIG. 6 is a view showing cladding radius distribution of a polarization maintaining optical fiber manufactured in Example 6.

FIG. 6 is a view showing cladding radius distribution of the polarization maintaining optical fiber manufactured in Example 6. As shown in this drawing, in this polarization maintaining optical fiber, the radius of the cladding region varies in a sinusoidal wave shape relative to the angle, and the non-circularity of the outer periphery around the cladding region was 0.3%.

As described above, according to the method of manufacturing a polarization maintaining optical fiber of the first embodiment, the width $R_y$ in the y-axis direction is made smaller than the width $R_x$ in the x-axis direction in the intermediate 20 and the preform 40. Accordingly, in the polarization maintaining optical fiber 1 obtained by drawing, the ratio of the width $r_x$ in the x-axis direction to the width $r_y$ in the y-axis direction comes close to 1, and the non-circularity of the outer periphery around the cladding region 12 is thereby reduced. Moreover, if the drawing speed was set to 90 m/min. or less upon drawing and the drawing tension was set to 16 g or less, it is further effective to reduce the non-circularity of the outer periphery around the cladding region 12 of the polarization maintaining optical fiber 1.

Figure 7:
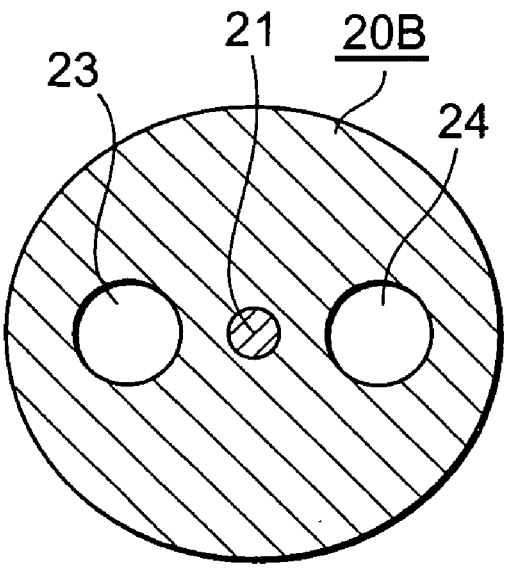
FIG. 7 and FIG. 8 are transverse sectional views both showing cross-sectional shapes of other intermediates in the first embodiment.
Figure 8:
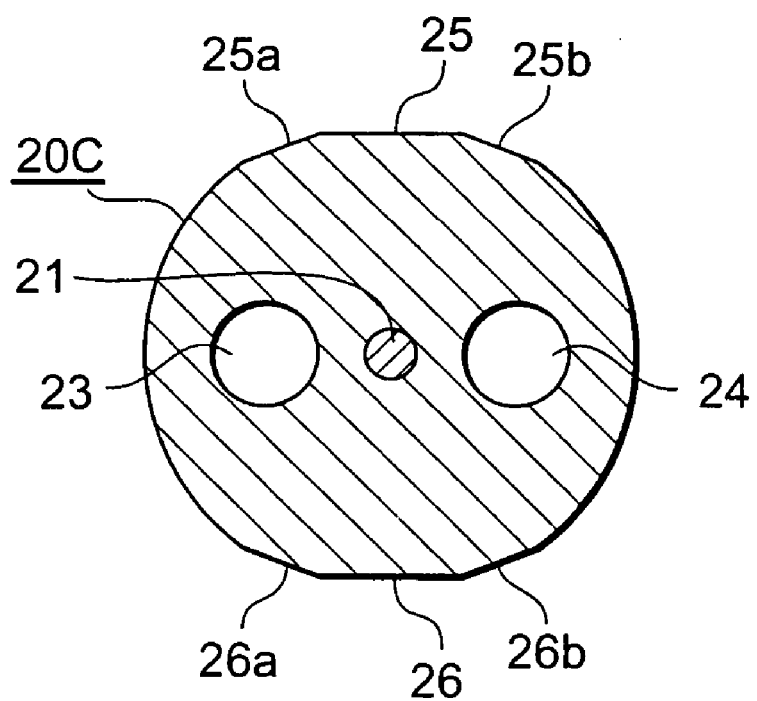

Various modifications are possible in this first embodiment. For example, the shape and the manufacturing method of the preform is not limited to those described above. For example, the cross-sectional shape of the intermediate may be elliptical as shown in FIG. 7, in which a diameter in the y-axis direction is smaller than a diameter in the x-axis direction. In this case, the preform 40 maybe fabricated by heating an intermediate 20B. Herein, the intermediate 20B is obtained by subjecting the intermediate 20A to heating and passing through a die having an elliptical inner diameter, and the like. Meanwhile, as shown in FIG. 8, it is possible to form the +y-side portion 25 of the intermediate shown in FIG. 2B into the flat surface by mechanical grinding and simultaneously form both end portions 25a and 25b of the face also into flat surfaces by mechanical grinding; meanwhile, it is possible to form the −y-side portion 26 into the flat surface by mechanical grinding and simultaneously form both end portions 26a and 26b of the face also into flat surfaces by mechanical grinding.

SECOND EMBODIMENT

Next, a description will be given of a second embodiment of the method of manufacturing a polarization maintaining optical fiber according to the present invention. In this method of manufacturing a polarization maintaining optical fiber of the second embodiment, the cross-sectional shape of the intermediate may be the shapes shown in FIG. 2B, FIG. 8 and FIG. 9, respectively. However, the outer periphery may be a perfect circle instead. In this embodiment, the stress applying parts 33 and 34 are also inserted into the pair of holes 23 and 24 of the intermediate 20, and the preform 40 is thereby manufactured. Then, similar to the first embodiment, the preform 40 is subjected to drawing by the method described severally with FIG. 4 and FIG. 5, and the polarization maintaining optical fiber is thereby manufactured.

Particularly, in the second embodiment, the tension upon drawing the preform 40 is set in the range from 1 g to 10 g inclusive, and the non-circularity of cladding is set to 1% or less (more preferably 0.5% or less) at the point where an outer diameter of a neck-down portion of the preform 40 becomes 3 mm. Herein, it is more preferable that the drawing tension be set to 5 g or less. In the polarization maintaining optical fiber manufactured by drawing under these conditions, the non-circularity of the outer periphery of the cladding region can be sufficiently reduced. Moreover, in this polarization maintaining optical fiber, an angular variation amount of a mode field diameter can be also sufficiently reduced.

This is attributable to the following reason. Specifically, in the process of manufacturing the polarization maintaining optical fiber by drawing the preform 40, the surface tension of glass of the preform 40 has an effect to reduce the noncircularity. When a fiber-forming temperature is increased, the drawing tension is reduced, and the surface tension is increased. By slowing down the drawing speed, a high-temperature region of the glass where the surface tension takes effect spreads. The non-circularity of the cladding is reduced by both of these effects. Then, as the outer diameter of the preform 40 is reduced by drawing, the non-circularity of the cladding is also reduced. However, the non-circularity of cladding is slightly increased at the point where the diameter of the preform becomes about 3 mm, and reaches the same degree as the non-circularity of cladding of the polarization maintaining optical fiber which is ultimately obtained. For this reason, by setting the non-circularity of cladding to 1% or less at the point where the outer diameter of the neck-down portion of the preform 40 becomes 3 mm, it is possible to set the non-circularity of the outer periphery around the cladding region of the manufactured polarization maintaining optical fiber to 1% or less. Moreover, spreading the temperature distribution by extending a heater for heating the preform 40 makes it possible to maintain large surface tension for a long time period. Accordingly, it is effective for reducing the non-circularity.

In the second embodiment, similar to the first embodiment, it is also preferable that the drawing speed upon drawing be set to 90 m/min. or less. Moreover, it is preferable that the drawing tension be set to 5 g or less. Accordingly, in the polarization maintaining optical fiber manufactured by this manufacturing method, it is possible to maintain the non-circularity of cladding of 1.0% or less.

Next, a description will be given regarding examples of the second embodiment. Table 2 is a chart arranging respective parameters in Examples a and b and Comparative Example.

TABLE 2

Parameters in Examples a and b and Comparative Example

|  | Examples | | |
| --- | --- | --- | --- |
|  | a | b | Comparative |
| Preform Diameter (mm) | 33 | 35 | 35 |
| Drawing Speed (m/min.) | 40 | 50 | 100 |
| Tension (g) | 4.5 | 5 | 15 |
| Noncircularity of Cladding (%) | 0.6 to 0.8 | 0.7 to 1.0 | 1.6 to 2.0 |

In Example a, the diameter of the preform was set to 33 mm, the drawing speed was set to 40 m/min., and the drawing tension was set to 4.5 g. In Example b, the diameter of the preform was set to 35 mm, the drawing speed was set to 50 m/min., and the drawing tension was set to 5 g. Meanwhile, in Comparative Example, the diameter of the preform was set to 35 mm, the drawing speed was set to 100 m/min., and the drawing tension was set to 15 g. The outer periphery of the preform was a perfect circle in Examples a and b and Comparative Example.

Figure 9A:
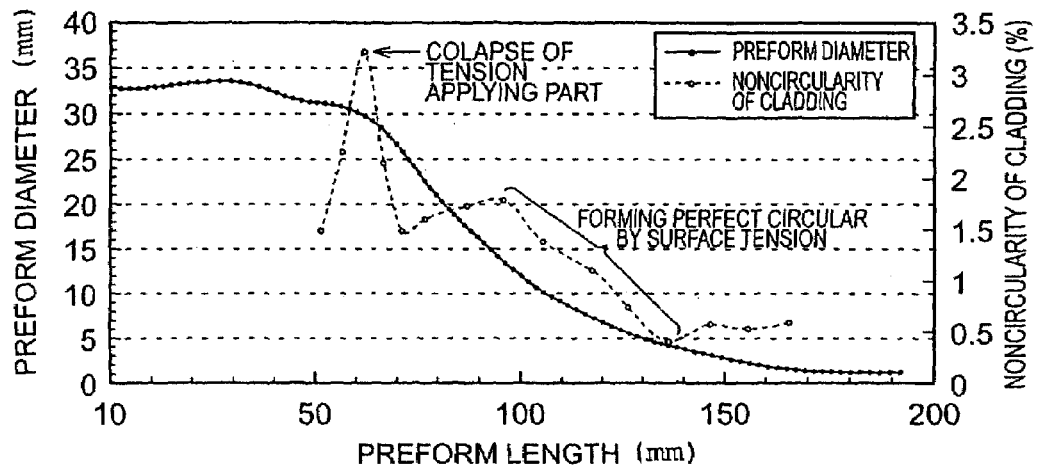
FIG. 9A is a view showing a neck-down shape of the preform and a non-circularity of cladding in Example a, and FIG. 9B is a view showing those in Example b.
Figure 9B:
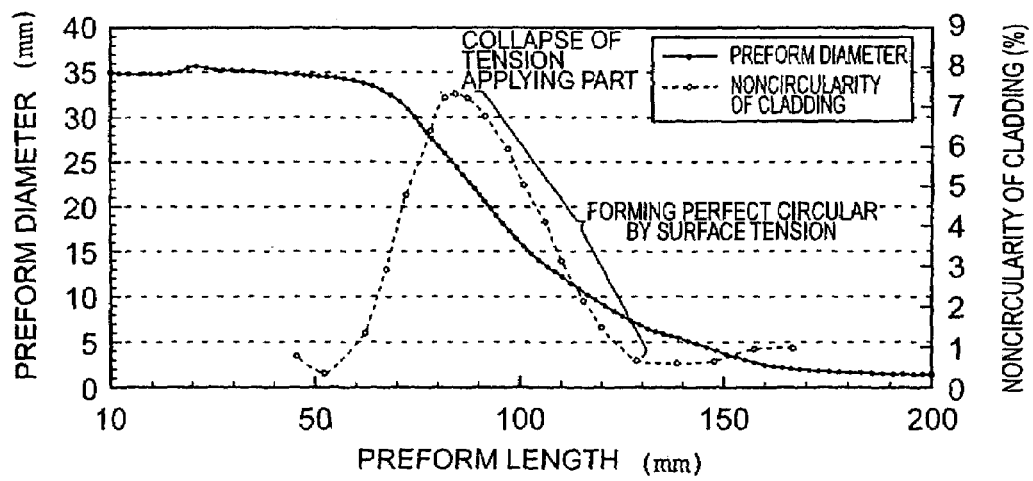

FIG. 9A is a view showing a neck-down shape of the preform and the non-circularity of cladding in Example a, and FIG. 9B is a view showing a neck-down shape of the preform and the non-circularity of cladding in Example b.

Regarding measurement of the neck-down shape of the preform, an outer diameter gauge was provided while inclining the outer diameter gauge only by 45 degrees relative to a straight line mutually connecting the pair of stress applying parts, and the preform was scanned in the longitudinal direction relative to this outer diameter gauge, whereby an average diameter of the preform in various positions in the longitudinal direction of the preform was measured. Regarding measurement of the non-circularity of cladding, the outer diameter gauge was fixed and the non-circularity of cladding was measured in various positions in the longitudinal direction of the preform as the preform was rotated.

The non-circularity of claddings of the manufactured polarization maintaining optical fibers were from 0.6% to 0.8% in Example a, from 0.7% to 1.0% in Example b, and from 1.6% to 2.0% in Comparative Example.

As shown in FIG. 9A, in Example a, the stress applying parts and the cladding portion started collapsing almost at the same time when the diameter of the preform started tapering, and the non-circularity of cladding was increased. Thereafter, as the diameter of the preform tapered further, the non-circularity of cladding was gradually reduced. At the point where the diameter of the preform was about 3 mm, the non-circularity of cladding was slightly increased and settled at the same degree as the non-circularity of cladding of the polarization maintaining optical fiber to be obtained ultimately.

Meanwhile, as shown in FIG. 9B, in Example b, the stress applying parts and the cladding portion also started collapsing almost at the same time when the diameter of the preform started tapering, and the non-circularity of cladding was increased. Thereafter, as the diameter of the preform tapered further, the non-circularity of cladding was gradually reduced. Then, at the point where the diameter of the preform was about 3 mm, the non-circularity of cladding was slightly increased and settled at the same degree as the non-circularity of cladding of the polarization maintaining optical fiber to be obtained ultimately.

As described above, it is apparent that the non-circularity of the outer periphery around the cladding region of the manufactured polarization maintaining optical fiber can be set to 1% or less by setting the non-circularity of cladding to 1% or less at the point where the outside diameter of the neck-down portion of the preform 40 becomes 3 mm.

Note that the neck-down shapes of the preforms in Examples a and b were the same. Presumably, it is because the neck-down shape of the preform depends on a heat zone of a drawing furnace. On the other hand, aspects of changes in the non-circularity of claddings are different between the Examples a and b. In other words, in Example a, the non-circularity of cladding suddenly dropped after the collapse in response to the reduction in the diameter of the preform. Thereafter, the non-circularity of cladding continued to be increased, decreased, and increased again. The second reduction in the non-circularity of cladding is considered due to occurrence of perfect-circle formation attributable to the surface tension. On the contrary, in Example b, the non-circularity of cladding was gradually increased before the collapse, and the non-circularity of cladding was gradually decreased after the collapse. Moreover, the maximum non-circularity of cladding during collapsing was about 3% in Example a, but was 7% or more in Example b.

Such a difference between Examples a and b is considered resulting from a difference in the diameters of the preforms. In other words, since the surface tension is equivalent to work for isothermally increasing only a unit area, a time period for accomplishing the work is shortened as the diameter of the preform is reduced. Therefore, as the diameter of the preform becomes smaller, perfect-circle formation resulting from the surface tension is exerted effectively. Thus, in Example a where the diameter of the preform is relatively small, the effect of perfect-circle formation is exerted simultaneously with the collapse. As a result, it is considered that the maximum non-circularity of cladding was reduced during collapsing.

THIRD EMBODIMENT

Figure 10A:
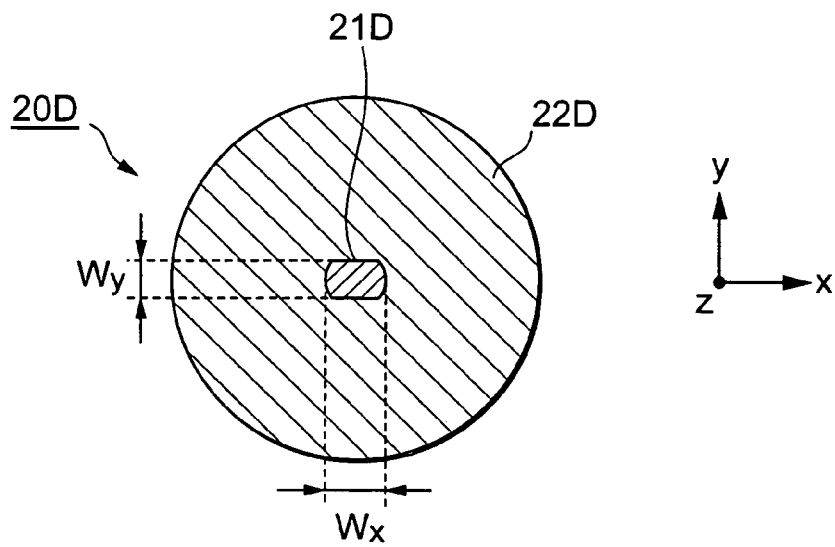
Figure 10B:
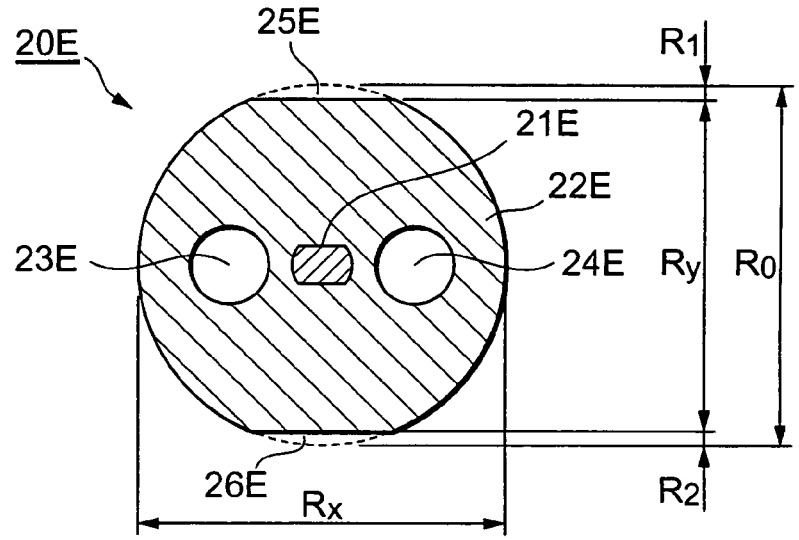
Figure 10C:
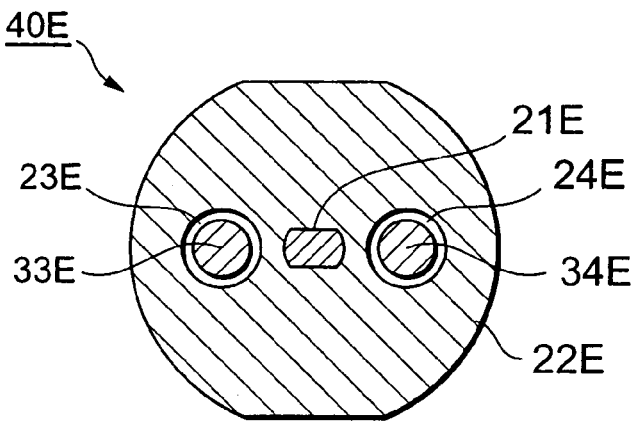
Figure 11:
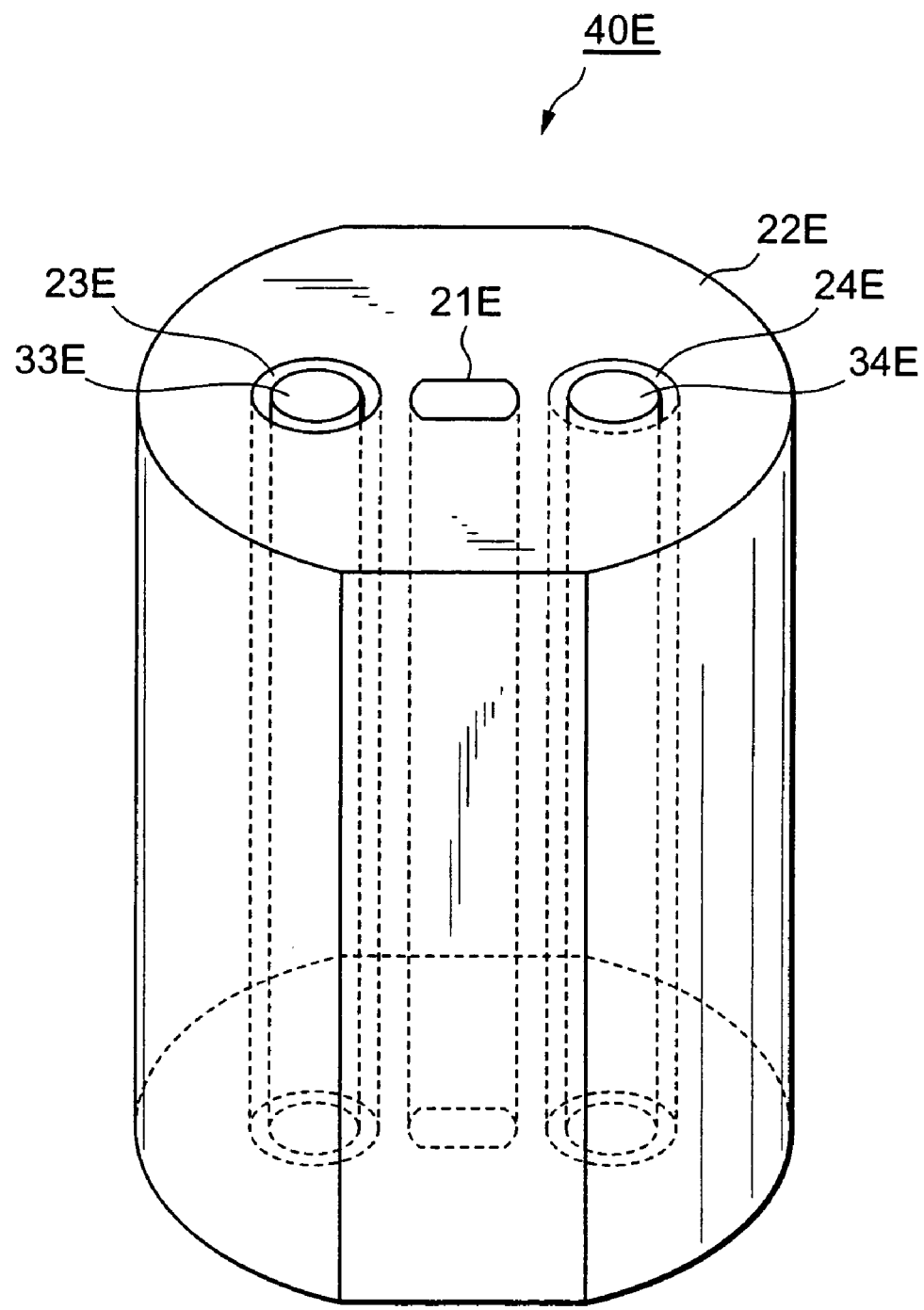
FIG. 11 is a perspective view of the optical fiber preform of FIG. 10C.

Next, a description will be given regarding a third embodiment of the method of manufacturing a polarization maintaining optical fiber according to the present invention. This method of manufacturing a polarization maintaining optical fiber of the third embodiment is characterized in that the shape of the optical fiber preform is further devised. FIG. 10A to FIG. 10C show cross-sectional shapes of an intermediate 20 and an optical fiber preform 40 and a fabrication process in this third embodiment. FIG. 11 is a perspective view showing the shape of this optical fiber preform 40.

As shown in FIG. 10A, unlike the core portion 21 of the intermediate preform 20 used in the first embodiment shown in FIG. 2A, a core part 21D of an intermediate preform 20D used in this embodiment has the shape in which a width $W_y$ in the y-axis direction is narrower than a width $W_x$ in the x-axis direction, instead of a cylindrical shape. This intermediate preform 20D can be manufactured as follows.

First, a cylindrical core rod is prepared and then processed by grinding sidewalls of the column so that a cross section is formed into an approximately rectangular shape or approximately square shape. In this event, corner portions of the rectangle may retain the original cylindrical shape. In this way, the shape of the core rod becomes either the approximately rectangular shape or the approximately square shape which is inscribed to the circle constituting the cross section of the original column, and portions obtained by grinding are located closer to the center than the periphery of this circle. When the core rod is formed into the rectangle, shorter sides are preferably smaller than longer sides by 0.5% to 10%, and more preferably by 2% to 7%.

Next, glass particles are deposited on the periphery of the approximately rectangular column thus formed and are subjected to sintering to form a cladding portion 22D, and the intermediate preform 20D shown in FIG. 10A is thereby obtained. Alternatively, the intermediate preform 20D shown in FIG. 10A is obtained by a rod-in-collapse method which is carried out by inserting the core rod having the shape of the approximately rectangular column thus formed into a glass pipe which constitutes the cladding portion 22D, heating and melting the foregoing constituents from the outside, and allowing the glass pipe to contract by surface tension so as to integrate the core rod and this glass pipe together.

Then, the short-side direction of a cross section of a core portion 21E is disposed in the y-axis direction and the long-side direction thereof is disposed in the x-axis direction. Thereafter, holes 24E are formed severally in positions so as to put the core portion 21E therebetween in the x-axis direction. Sidewall portions 25E and 26E of the cladding portion 22E are ground off and widths in the y-axis direction thereof are made smaller than widths in the x-axis direction thereof, and an intermediate 20E shown in FIG. 10B is thereby obtained. Subsequently, an optical fiber preform 40E shown in FIG. 10C and FIG. 11 is obtained by inserting stress applying parts 33E and 34E severally into the holes 23E and 24E.

Drawing conditions for the optical fiber preform 40E of this embodiment are the same as those in the first embodiment. The stress applying parts 33E and 34E and a main body of the preform 40E (the cladding portion 22E, to be more precise) are integrated together by drawing. In this event, due to a difference in surface tensions among members, the core portion 21E is stretched toward the stress applying parts 33E and 34E and thereby existed in the x-axis direction. Moreover, since the top and the bottom (in the y-axis direction) of the cladding region 21E are ground off, the core portion 21E is also stretched in the y-axis direction from this influence. At this moment, the influence to stretch the core portion 21E becomes greater in the y-axis direction than in the x-axis direction. As a result, in the polarization maintaining optical fiber 1 obtained as a result of drawing, it is possible to approximate the core region 11 to a perfect circle and thereby to limit the non-circularity thereof. Since a cladding region and a core region were formed noncircular in a conventional polarization maintaining optical fiber, an angular variation of an MFD (mode field diameter) thereof accounted for approximately 3% to 4%. On the contrary, it is possible to reduce the angular variation to 2% or less in the case of manufacturing according to this embodiment. This is because the non-circularity of the cladding region and the core region can be reduced to 2% or less, more preferably to 1% or less, or even more preferably to 0.5% or less.

Herein, whether the core portion 21E is stretched more strongly in the x-axis direction or in the y-axis direction is determined by the sizes of the holes 23E and 24E and a grinding amount of the cladding portion 22E. When the holes 23E and 24E are formed so as to set the diameters of the stress applying parts in the optical fiber to 33 to 35 $\mu$m and the cladding portion 22E is ground off so as to satisfy $0.90 \leq R_y/R_x \leq 0.98$, the influence to stretch the core portion 21E becomes greater in the y-axis direction than in the x-axis direction. Meanwhile, the influence to stretch in the x-axis direction is increased when the diameters of the stress applying parts are increased, and the influence to stretch in the y-axis direction is increased when the grinding amounts of the top and the bottom (in the y-axis direction) of the cladding region are increased.

Herein, a description has been given regarding the example of processing the shape of the core rod from the cylindrical shape into the approximately rectangular column by mechanical grinding. However, it is also possible to form a core rod of a desired shape by removal with a chemical method, processing only corner portions of a core rod having a shape of an approximately rectangular column so as to form the corner portions into approximately cylindrical shapes, or by use of deposition or forging. Moreover, the shape of the core rod is not limited only to the rectangular column. It is satisfactory as long as the core rod is formed into a circular shape in which both end portions of at least one diametrical direction are removed. The core rod may be also formed into an elliptical shape, a capsular shape, and the like.

Meanwhile, it is also possible to use a core rod having refraction index distribution by itself or a core rod having adjusted dispersion power. In this way, it is possible to adjust profiles of the polarization maintaining optical fiber freely.

As detailed above, according to the present invention, in the state where the stress applying parts are inserted into the holes of the intermediate, the slight gaps exist between the inner wall surfaces of the holes and the outer wall surfaces of the stress applying parts. Therefore, when the polarization maintaining optical fiber is manufactured by drawing these materials, the reduction rate of the width in the first direction mutually connecting the respective centers of the pair of stress applying parts becomes greater than the reduction rate in the second direction orthogonal thereto. However, since the width in the second direction is made smaller than the width in the first direction in the intermediate, the polarization maintaining optical fiber obtained by drawing has the ratio of the width in the first direction to the width in the second direction which is close to 1, and the non-circularity of the outer periphery around the cladding region is thereby reduced. Alternatively, the temperature of the drawing furnace is raised, and the optical fiber preform is drawn and integrated with the drawing tension from 1 g to 10 g inclusive. Then, the non-circularity of cladding is set to 1% or less at the point where the outer diameter of the neck-down portion of the optical fiber preform becomes 3 mm. Accordingly, the non-circularity of the outer periphery around the cladding region is reduced in the polarization maintaining optical fiber obtained by drawing. Moreover, when the high surface tension is maintained for a long time period by slowing down the drawing speed or by extending the heater length, it is possible to reduce the non-circularity of cladding effectively.

According to the present invention, it is possible to obtain the polarization maintaining optical fiber having the non-circularity of cladding of 1% or less. In the present invention, by cleaning the gaps between the holes and the stress applying parts of the preform, it is possible to perform drawing while reducing the drawing speed and the tension. In this way, it is possible to obtain the polarization maintaining optical fiber having the non-circularity of cladding of 0.5% or less. The polarization maintaining optical fiber thus manufactured has a small variation in the outer diameter thereof. Accordingly, it is possible to improve connectivity with respect to a connector.

Figure 12:
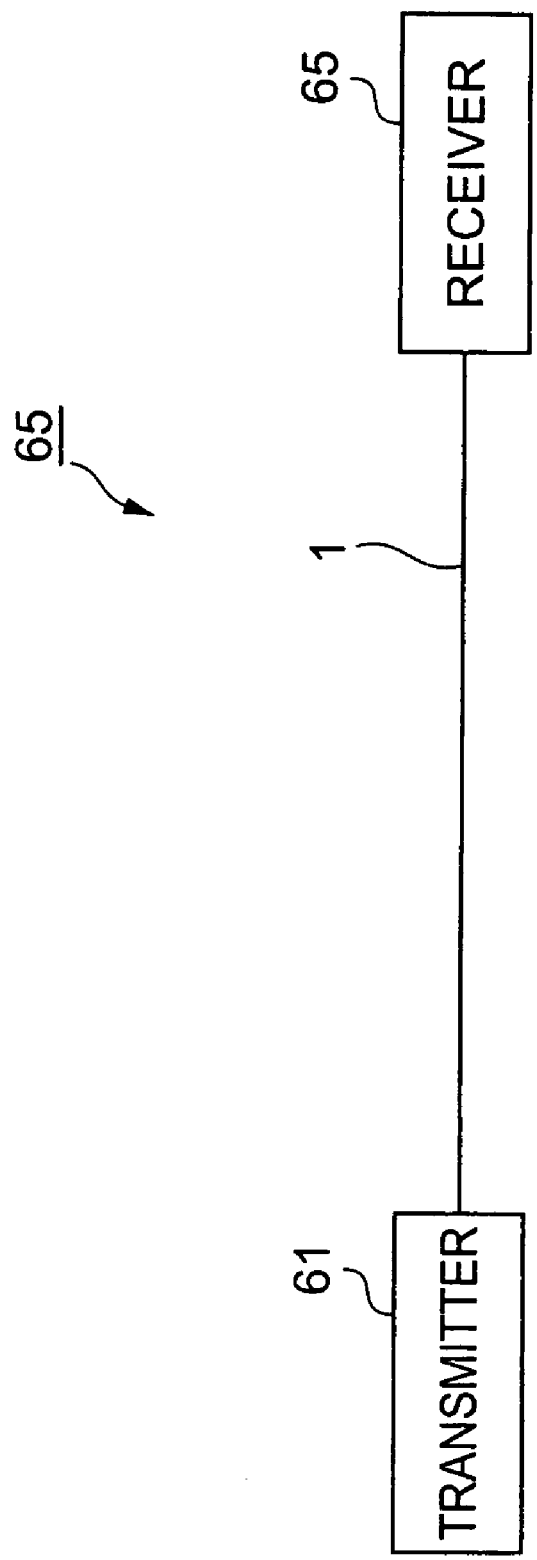
FIG. 12 is a schematic view of an optical fiber communication system according to the present invention.

FIG. 12 is a constitutional view schematically showing an optical fiber communication system using the above-described polarization maintaining optical fiber according to the present invention. In this optical fiber communication system 65, a transmitter 61 and a receiver 62 are connected to each other with the polarization maintaining optical fiber 1 so as to enable transmission. Since the polarization maintaining optical fiber 1 used for signal transmission includes two polarization axes, it is possible to propagate signals by use of the respective axes. Accordingly, it is possible to double a transmission capacity.

INDUSTRIAL APPLICABILITY

The polarization maintaining optical fiber and the manufacturing method thereof according to the present invention are suitably applicable to a polarization maintaining optical fiber for use in high speed optical transmission.

The invention claimed is:

1. A method of manufacturing a polarization maintaining optical fiber having a pair of stress applying regions on both sides of a core region existing in an axial direction within a cladding region surrounding this core region, the method comprising the steps of:
   preparing an intermediate including a cladding portion which constitutes the cladding region and surrounds a core portion constituting the core region, the cladding portion including a pair of holes existing in parallel with the axial direction on both sides of the core portion;
   manufacturing an optical fiber preform by inserting stress applying parts severally into the pair of holes of the intermediate, the stress applying parts having outer diameters slightly smaller than inner diameters of the holes; and
   manufacturing the polarization maintaining optical fiber by drawing and integrating the optical fiber preform with drawing tension from 1 g to 10 g inclusive while setting a non-circularity of cladding to 1% or less at a point where an outer diameter of a neck-down portion of the optical fiber preform becomes 3 mm.

2. The method of manufacturing a polarization maintaining optical fiber according to claim 1,
   wherein a width in a first direction connecting centers of the pair of hole parts is formed greater than a width in a second direction being orthogonal thereto in a cross section perpendicular to the axial direction of the intermediate.

3. The method of manufacturing a polarization maintaining optical fiber according to claim 2,
   wherein
   the intermediate is fabricated by preparing a material having a circular cross section perpendicular to the axial direction thereof and grinding an outer peripheral portion of this material in the second direction.

4. The method of manufacturing a polarization maintaining optical fiber according to claim 2,
   wherein the width in the second direction is smaller than the width in the first direction by 0.5% to 10% at the cross section perpendicular to the axial direction of the intermediate.

5. The method of manufacturing a polarization maintaining optical fiber according to claim 2,
   wherein a shape of a cross section perpendicular to the axial direction of the core portion of the intermediate is a shape in which both end portions on the diameter along at least any of the first direction and the second direction are disposed relative to an inscribed circle thereof as closer to a center side of the circle than a periphery of the circle.

6. The method of manufacturing a polarization maintaining optical fiber according to claim 5,
   wherein the cross section of the core portion is formed such that the width in the first direction is formed smaller than the width in the second direction.

7. The method of manufacturing a polarization maintaining optical fiber according to claim 5,
   wherein the cross section of the core portion is formed such that the width in the first direction is formed greater than the width in the second direction.

8. The method of manufacturing a polarization maintaining optical fiber according any one of claims 5 to 7,
   wherein the cross section of the core portion has a shape in which any of both end portions of the circle in the first direction and both end portions of the circle in the second direction are removed.

9. The method of manufacturing a polarization maintaining optical fiber according to claim 1,
   wherein drawing speed is set to 90 m/minor less upon drawing.

10. The method of manufacturing a polarization maintaining optical fiber according to claim 1, further comprising the step of:
    heating the optical fiber preform after insertion of the stress applying parts severally into the pair of holes of the intermediate while setting respective gaps between the pair of holes and the stress applying parts as an atmosphere of any of inert gas and halogen gas.

11. A polarization maintaining optical fiber made by the method of claim 1, having a pair of stress applying parts on both sides of a core region within a cladding region surrounding the core region existing in an axial direction,
   wherein a non-circularity of an outer shape of a cross section of the cladding region in the axial direction is 1.0% or less.

12. The polarization maintaining optical fiber according to claim 11,
   wherein the non-circularity of the cladding is 0.5% or less.

13. A polarization maintaining optical fiber made by the method of claim 1, having a pair of stress applying parts on both sides of a core region within a cladding region surrounding the core region existing in an axial direction,
   wherein a non-circularity of an outer shape of a cross section of the cladding region in the axial direction is 1.0% or less and an angular variation of an MFD is 2% or less.

14. An optical fiber communication system comprising:
a transmitter;
a receiver; and
the polarization maintaining optical fiber according to claim 11 which connects the transmitter and the receiver to transmit an optical signal.

* * * * *